United States Patent [19]

Davis et al.

[11] 4,214,975

[45] Jul. 29, 1980

[54] SOLVENT RECOVERY PROCESS FOR PROCESSING OF HYDROCARBONS

[75] Inventors: Hyman R. Davis, Glen Ridge; Wagih I. Nasr, Belleville; Siegfried M. Roethlin, Glen Rock; Harold D. Sherwood, Oradell, all of N.J.

[73] Assignee: The Lummus Company, Bloomfield, N.J.

[21] Appl. No.: 904,710

[22] Filed: May 10, 1978

[51] Int. Cl.² ............................................. C10G 21/28
[52] U.S. Cl. ...................................... 208/33; 208/309; 208/321
[58] Field of Search ............... 208/321, 361, 365, 354, 208/364, 33, 309

[56] References Cited

U.S. PATENT DOCUMENTS

| 2,324,112 | 7/1943 | Rupp et al. | 208/354 |
| 2,895,908 | 7/1959 | Beavon | 208/321 |
| 2,907,709 | 10/1959 | Benedict | 208/31 |
| 2,943,050 | 6/1960 | Beavon | 208/309 |
| 3,461,066 | 8/1969 | Morris et al. | 208/321 |

Primary Examiner—Herbert Levine
Attorney, Agent, or Firm—James N. Blauvelt; Louis E. Marn

[57] ABSTRACT

A solvent recovery portion of a solvent refining plant for producing oil products such as lubricating oils from a crude source of hydrocarbons such as petroleum hydrocarbons wherein there are provided at least three continuous flash stages or zones for which each successive stage or zone operates at pressure and temperature levels higher than the preceding one, the vapor from any successive stage or zone being employed as the heating medium in the preceding one to effect the vaporization in said preceding stage or zone.

13 Claims, 2 Drawing Figures

SOLVENT RECOVERY PROCESS FOR PROCESSING OF HYDROCARBONS

BACKGROUND OF THE INVENTION

1. Field of the Invention

This invention relates to solvent refining processes used in the production of oil products such as lubricating oils, and more particularly relates to an improved process for recovering solvent from a solution thereof.

In general, the present invention is broadly concerned with a variety of solvent recovery processes associated with the processing of a variety of crude hydrocarbon sources such as naturally occurring petroleum hydrocarbons, refined shale oils, tar-containing sands, etc.

The quality of various oil or petroleum fractions derived from such crude hydrocarbon sources has for a long time been upgraded by removal therefrom of certain undesirable constituents. For example, in the case of vacuum gas oils or deasphalted residual oils wherein such constituents, for example, comprise cyclic, naphthenic, olefinic, aromatic, nitrogenous, and sulfurous compounds, or mixtures of such compounds, such constituents are generally removed by a solvent refining or extraction process, utilizing selective solvents such as furfural, phenol, N-methyl pyrrolidone, nitrobenzene, and the like, thereby to increase the viscosity index and stability of the resulting product. However, in the case of wax-containing oils, wherein such constituents comprise materials having a high melting point such as waxes which impair either the pour point or cloud point of the resulting desired product, such constituents are generally removed by a solvent dewaxing process, utilizing selective solvents or solvent combinations such as (a) methyl ethyl ketone; (b) methyl isobutyl ketone; (c) combinations of each of (a) and (b) with benzene or toluene, mixtures of benzene and toluene, or raffinates rich in benzene and toluene; and (d) other selective solvents such as dichloromethane, methylene chloride, etc.

The present invention, however, is not only applicable to, and employable in, solvent refining or solvent dewaxing processes utilizing the foregoing solvents, solvent combinations and/or solvent mixtures, but it is also applicable to, and employable in petroleum deasphalting processes which also use selective solvents or solvent systems such as one or more of the following solvents such as propane, butanes, etc., taken alone or in admixture with traces of ethane, $C_5$ alkanes, propylene, and butylene in non-deleterious quantities.

Generally, petroleum deasphalting and solvent refining and dewaxing processes are well known in the art and are effected by introducing a material to be treated, that is, a charge stock in which there are present at least two different chemical entities which have different solubilities or preferences in the presence of each other in a solvent into a solvent extraction zone in which the charge stock is contacted with a solvent.

At one end of the zone, in the usual petroleum deasphalting or solvent refining or dewaxing process, there is removed a raffinate-mix fraction which represents that chemical entity which is not as soluble in the solvent as the extract-mix fraction which contains the other entity and is removed at the other end of the zone.

An important aspect of these processes, including the preferred embodiments thereof such as furfural refining, propane or butane deasphalting, or methyl ethyl ketone/toluene dewaxing, is the subsequent treatment of the raffinate-mix, extract-mix fractions and/or the wax-free oil fraction, and/or the wax fraction and/or the asphalt-free oil fraction, and/or the asphalt fraction to recover not only the upgraded petroleum fraction but also to recover substantially all of the solvent from such fractions. Generally, the separation of solvent from the raffinate-mix fraction is readily performed in a single fractionating tower utilizing stripping techniques. Treatment of the extract-mix fraction to recover the solvent therefrom, however, is substantially more difficult because of the greater volume of the solvent in the undesired extracted constituents of the petroleum fraction being treated. Thus, a more complicated recovery scheme is required to separate solvent from the extract fraction. Like problems exist in the treatment of the filtrate in solvent dewaxing or deasphalting processes.

2. Description of the Prior Art

In U.S. Pat. No. 2,895,908 to Beavon, there is disclosed a process for recovering furfural from the extract fraction by successive passage through two vacuum flash towers operated preferably in the absolute pressure range of from 5 to 700 mm. Hg.; it is stated in this patent that it is desirable to operate the first flash tower at an absolute pressure greater than the second flash tower.

In U.S. Pat. No. 2,943,050 to the same patentee, there is disclosed a solvent extraction process, i.e., deasphalting, wherein the oil solvent extraction fraction is successively passed through two flash drums to recover solvent.

The nature of the petroleum fraction being treated, i.e., in terms of the initial boiling points thereof, has also led to the use of such separation techniques as simple distillation, azeotropic distillation, or a combination of extractive distillation and azeotropic distillation, such as disclosed in U.S. Pat. No. 3,167,501 to Woodle.

Although the techniques of solvent extraction have been refined to a sophisticated degree, the methods of solvent recovery, even in plants being presently constructed, are based on technology used twenty years ago. As a result, a considerable portion of the operating cost is borne by the heat energy to distill the solvent. The amount of energy is almost proportional to the total amount of solvent circulated through the extraction with between about 75 to about 85% being used in the distillation of the extract phase. Consequently, the recent energy crisis and the increased consciousness of the world with respect to energy have dictated a necessity to re-evaluate processing technology so as to minimize energy requirements and thereby reduce fuel costs. Thus, new plants need to be designed with technical inovations which minimize heat requirements, and existing plants need to be re-evaluated as well as revamped to reduce energy requirements.

OBJECTS OF THE INVENTION

An object of the present invention is to provide an improved process for solvent separation in solvent refining processes used in the processing of petroleum fractions.

Another object of the present invention is to provide an improved process for solvent separation in solvent refining and solvent dewaxing processes to reduce substantially energy requirements.

Still another object of the present invention is to provide a method of revamping existing solvent separative portions of solvent refining processes and solvent dewaxing processes.

A further object of the present invention is to provide an improved process for more effectively separating solvent from a solvent-enriched stream containing extracted undesired petroleum constituents of a solvent-refined or solvent-dewaxed petroleum fraction to reduce substantially energy requirements.

A still further object of the present invention is to provide a method for producing steam from solvent separation processes of solvent refining processes and solvent dewaxing processes.

SUMMARY OF THE INVENTION

The foregoing and other objects of the present invention are achieved by providing, in a solvent separation portion of a solvent refining plant, or a solvent dewaxing plant, or a petroleum deasphalting plant, at least three continuous flash stages or zones for which each successive stage or zone operates at pressure and temperature levels higher than the preceding stage or zone, the vapor from any successive stage or zone being employed as the heating medium in the preceding stage or zone to effect the vaporization in said preceding stage or zone. In a preferred embodiment of the invention, wherein there are, as stated above, at least three continuous flash stages or zones, the liquid effluent from the second or penultimate zone is passed through a heater, preferably a fired heater, prior to introduction into the third or last zone. The heater is preferably used for the highest pressure and temperature flash.

In one aspect of the present invention, vaporized solvent is condensed at a low temperature level to provide a source of steam for ordinary usage.

In accordance with another aspect of the present invention, existing solvent separation portions of refining plants are revamped in a manner as hereinabove discussed. It has been found, for example, that the conversion of an existing furfural unit in a plant producing 4,000 barrels of product would result in a savings of between $600,000, to $800,00, based on 1977 fuel costs. Since dewaxing and deasphalting plants generally have higher solvent circulation rates, significantly greater economic benefits are believed to be attainable for such plants.

BRIEF DESCRIPTION OF THE DRAWINGS

A better understanding of the present invention as well as additional objects and advantages thereof will become apparent upon consideration of the detailed disclosure thereof, especially when taken with the accompanying drawings, which consist of schematic flow diagrams of, respectively, the overall solvent refining process of the present invention (FIG. 1) and a modified version thereof (FIG. 2) showing how the present application can be applied in a solvent dewaxing system.

DETAILED DESCRIPTION OF THE INVENTION

It is to be understood that equipment, such as certain pumps, valves, indicators, and the like have been omitted from the drawings to facilitate the description thereof and that the placing of such equipment at appropriate places is deemed to be within the scope of those skilled in the art. To facilitate an understanding of the present invention, an illustrative refining process therefor will be described with reference to the solvent extraction of a feed stock for lube oil using furfural as the extracting solvent wherein such feed stock includes the ordinary gas oils having a boiling point of at least 600° F.

Figure 1:
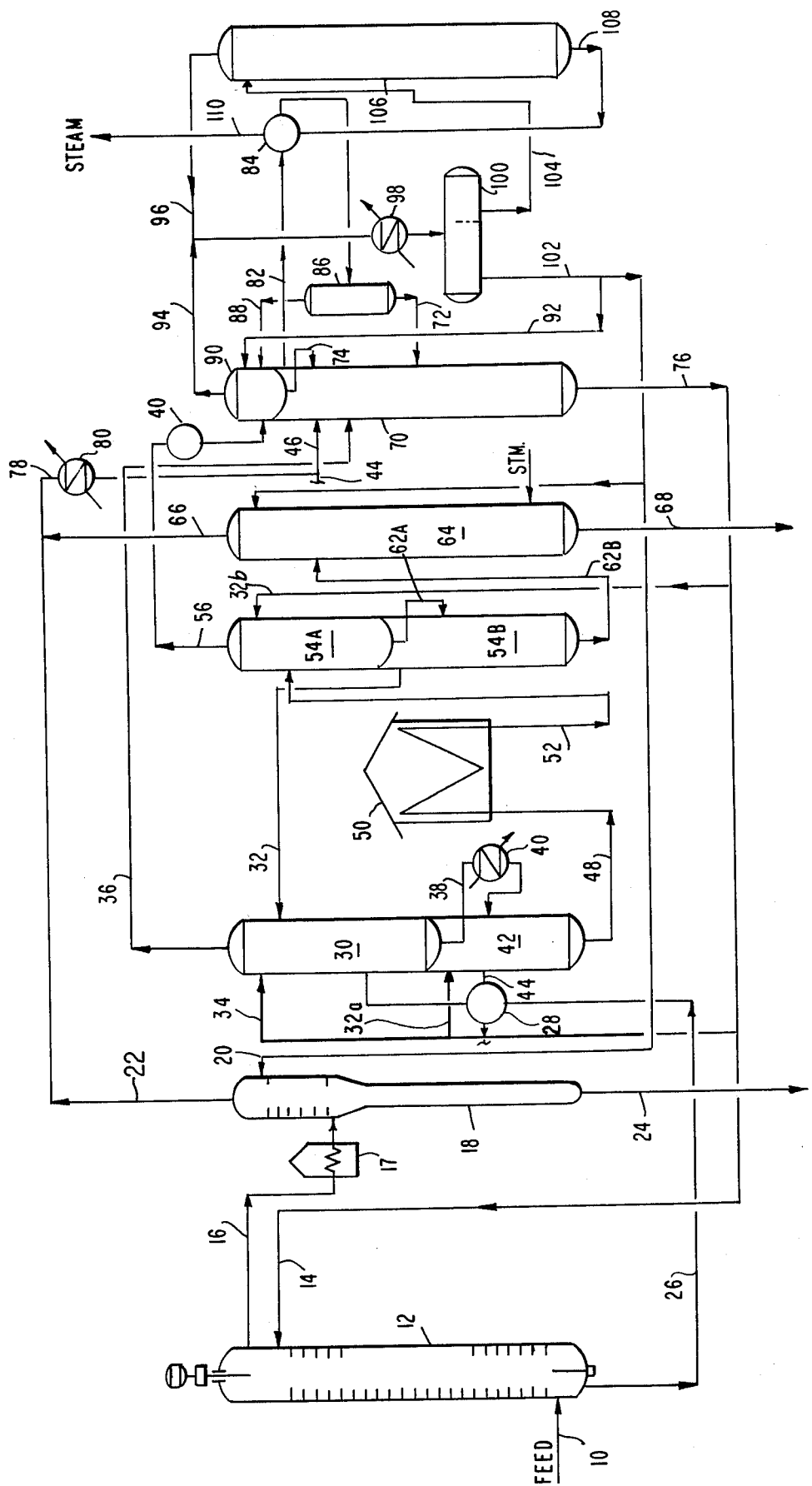

Referring now to FIG. 1 of the drawings, a feed stock in line 10 is introduced into an extraction column 12 and is countercurrently contacted with furfural introduced through line 14 into the upper portion of the column 12. The column 12 is illustrated as being a rotating disc contacting column, such as disclosed in U.S. Pat. No. 2,273,660; however, it will be understood that other forms of contacting units may be employed, such as packed counter-flow contactors or the like. In the column 12, the feed stock and furfural are contacted in a manner to effect extraction of the impurities, aromatics and other low viscosity index constituents from the feed stock.

A raffinate mix, generally comprising refined lubricating oil stock and a small amount of dissolved solvent is withdrawn through line 16 from the column 12 and is passed to a heater 17 and then to raffinate stripping column 18 including a furfural reflux stream in line 20. Preferably, the raffinate mix is exchanged with finished raffinate to conserve heat; however, such exchange is not shown. Generally, steam is introduced into the lower portion of the column 18, and all of the steam, together with substantially all of the solvent contained in the raffinate-mix stream, is removed as a distillate overhead in line 22 from column 18. Refined oil (free of solvent) or raffinate is withdrawn as bottoms in line 24 from the column 18 and is passed to storage (not shown).

An extract-mix comprising solvent and dissolved undesirable hydrocarbons is withdrawn in line 26 from the contacting column 12. The extract-mix stream in line 26 is sometimes cooled and permitted to settle by means not shown. All of the extract mix stream is passed via a heat exchanger 28 into a first flash column 30 wherein the resulting vapors and vapors in line 32 are contacted with furfural reflux in line 34, as more fully hereinafter disclosed. The first flash column 30 is operated at a temperature of from 330° F. to 350° F., and at a pressure in the range of 2 to 5 psig.

A gaseous overhead stream in line 36 comprising solvent and water is withdrawn from the column 30 and passed to a furfural column 70. Also withdrawn from column 30 via line 38 is a liquid bottoms comprising substantially solvent and oil and traces of water which is passed via heat exchanger 40 to a second flash liquid bottoms column 42 in which a furfural reflux is introduced via line 32a. The second flash column 42 is operated at a temperature of from 360° F. to 385° F., and at a pressure in the range of 10 to 25 psig. A gaseous stream comprising solvent in line 44 is withdrawn from the second flash column 42 and is passed through the heat exchanger 28 in indirect heat transfer relationship with the liquid extract mixture in line 26 to provide the heat transfer requirements for the first flash evaporator column 30. A liquid bottoms in line 48 comprising substantially solvent and oil is withdrawn from the second flash column 42 and is passed through a fired heater 50 wherein the liquid is heated by indirect heat transfer relationship with a burning combustion medium therein. The liquid stream in line 52, heated to a preselected temperature level, is withdrawn from the heater 50 and is introduced into a third flash column 54a in which a furfural reflux is introduced by line 32b. The third flash column 54a is operated at a temperature of from 400° F. to 480° F., and at a pressure in the range of 25 to 50 psig. A gaseous overhead in line 56 withdrawn from the third flash column 54a is passed to furfural column 70 via the heat exchanger 40, which provides the heat transfer requirements for the liquid bottoms in line 38 introduced into the second flash column 42. The bottoms liquid 62a from column 54a comprising solvent and oil optionally can go to a fourth flash column 54b which operates at approximately the same pressure as column 30 or else to a stripping column 64. Vapor in line 32 goes to flash column 30.

A substantially solvent-free extract is withdrawn as bottoms in line 62b from the fourth flash column 54b and is introduced into a stripping column 64 to strip residual solvent and form the extract which is withdrawn as bottoms in line 68. Steam is introduced into the extract stripping column 64 where substantially all of the solvent and steam is withdrawn as overhead in line 66.

The gaseous stream in line 36 from the first flash column 30 is introduced into a furfural column 70 and contacted with furfural-containing liquid streams in lines 46, 56, 72, and 74 wherein furfural in the vapor phase is rectified or caused to be condensed therefrom with concomitant water vaporization to provide: a substantially dry furfural stream in line 76; a solvent stream used, inter alia, for solvent extraction in column 12; and the liquid reflux streams in line 34, 32a, and 32b for the flash columns. The liquid furfural stream in line 46 is obtained by combining the condensate in line 44 with a condensate in line 78, obtained by condensing, in heat exchanger 80, the gaseous overheads in lines 22 and 66 from columns 18 and 64, respectively. The liquid furfural-containing stream in line 72 is obtained by passing the overhead stream in line 82 from the furfural column 70 through a heat exchanger 84 for condensation with the resulting condensate being separated in a flash drum 86 into the liquid furfural stream in line 72 and an uncondensed gaseous stream in line 88. The gaseous stream in line 88 is introduced into a solvent stripper 90 in contacting relationship with a liquid furfural-containing stream in line 92 to rectify furfural vapors in line 88. A gaseous overhead in line 94 withdrawn from the solvent stripping 90 is combined with a gaseous stream in line 96 and is passed through a condenser 98 with the resulting condensate being subsequently introduced into an accumulator drum 100 wherein the condensate is separated into a furfural-enriched portion and a water-enriched portion.

The furfural-enriched portion is withdrawn by line 102 to provide liquid reflux streams for the raffinate stripping column 18, extract stripping column 64, and for drying in the solvent stripper zone in line 92. The water-enriched portion is withdrawn by line 104 and is passed to a heated water removal tower 106, the bottoms from which in line 108 are passed to heat exchanger 84 to provide low pressure process steam in line 110. The gaseous overhead in line 96 withdrawn from the tower 106 is combined with the stripper gaseous overhead in line 94 as hereinabove discussed. As an alternative to the fired heaters, which have been previously described above, hot oil or high pressure steam can be used.

Figure 2:
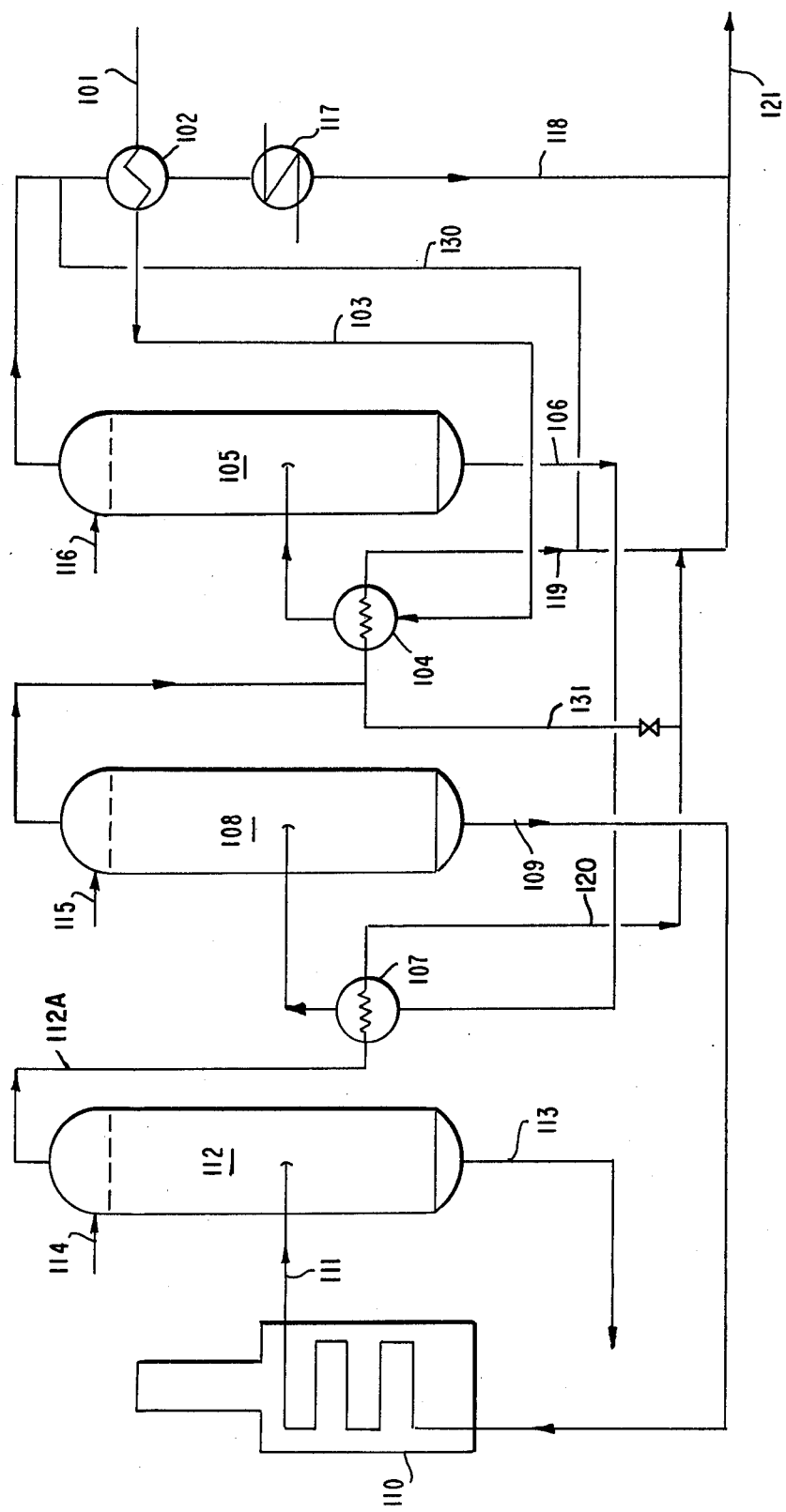

Referring now to FIG. 2 of the drawings, there is shown an embodiment of the present invention as such may be applied in a solvent dewaxing system. The nature of the solvent is not a material factor in such application, and all the conventional solvents such as methyl ethyl ketone, methyl isobutyl ketone, dichloromethane, and methylene chloride, etc., can be used provided that the ordinary and conventional adjustments in pressure and temperature within the skill of and knowledge in the art to effect be used to accommodate the nature of the individual solvent or solvent system employed. For purposes of FIG. 2, it is to be understood that the material to be treated generally comprises a solution of wax plus solvent and/or a solution of oil plus solvent. In the case of wax plus solvent, there is generally found at least two volumes of solvent per volume of wax, whereas in the case of oil plus solvent, there is generally found at least three volumes of solvent per volume of oil.

As shown more particularly in FIG. 2, a solution, in line 101, of the wax and/or oil plus solvent to be treated is passed successively through first an overhead heat exchanger 102 and then, via line 103, through heater 104 to partially vaporize the solvent. The resultant mixture is then fed into a first flash zone 105, which is operated at a pressure in the range of 0-5 psig. First flash zone 105 shown, e.g., as a flash drum can, if desired, be refluxed with solvent via line 116 to "knock down" any entrained oil. In an alternative embodiment, heater 104 and first flash zone 105 can be replaced by a kettle-type evaporator or similar equipment.

The solvent vaporized in the first flash zone 105 is withdrawn from said zone and passed overhead through the heat exchanger 102 to an air-cooled or water-cooled condenser 117 from which the resulting liquid solvent is withdrawn via line 118 for reuse in the solvent dewaxing system.

The heat necessary to operate heater 104 is derived by condensation of the vapors obtained as overhead product from flash drum 108, which operates, at a pressure in the range of 20-50 psig, as the second flash zone 108 in FIG. 2, and the vapors condensed in heater 104 are withdrawn therefrom via line 119 for deployment elsewhere as may be desired in the dewaxing system.

The unevaporated liquid in the first flash zone 105 is then fed via line 106 to said second flash zone 108 (shown as a flash drum through heater 107, wherein the solvent is partially vaporized by heat provided from the pressure vapors of the third flash zone 112 and enters the second flash zone 108 as partially vaporized liquid. As in the case of the first flash zone 105, the second flash zone 108 too can be refluxed with solvent, as, e.g., through line 115.

The second flash zone 108 is operated at a higher pressure level than that at which the first flash zone is operated, viz. at a pressure, as stated above, in the range of 20-50 psig. The clean pressure vapor produced in the second flash zone is then withdrawn therefrom and passed to heater 104, whereupon condensing its latent heat, it is employed to vaporize solvent entering the first flash zone.

As with the heater 104-first flash zone 105 combination, heater 107 and the second flash zone combination can be replaced by a kettle-type evaporator or some other equivalent equipment.

The unvaporized bottoms from the second flash zone 108 are then passed to heater 110 via line 109, and the resulting partially evaporated stream is withdrawn therefrom and fed into the third flash zone 112 (shown also as a flash drum) via line 111.

The third flash zone 112 is operated at a pressure level successively higher than the two preceding zones, viz., at a pressure level in the range of 40-100 psig. The evaporated solvent from the third flash zone 112 is withdrawn as an overhead product via line 112A and is passed into heater 107 wherein, upon the condensation of such overhead product therein, evaporation of the solvent is caused to be effected in heater 107.

Heater 110, for purposes of illustration, has been shown as a fired heater, but it is to be understood that its function as a source of heat could readily be replaced by other heating means or sources of heat well known to those skilled in the art. Such equivalent means would include, by means of non-limiting examples, steam, hot oil, "Dowtherm", and other suitable heat transfer media and equipment.

As with the heater 104-first flash zone 105 and heater 107-second flash zone 108 combinations previously discussed above, the fired heater 110-third flash zone combination can be replaced by a suitable kettle-type evaporator or some other equivalent equipment.

The unevaporated bottoms exiting from the third flash zone 112 normally contain about 5 to about 12% solvent and are passed via line 113 to an appropriate steam, gas, or vacuum stripper, as is customarily used for separation of solvent from the higher boiling oil.

As would be apparent to those skilled in the art, the above system is susceptible to a number of obvious modifications. For example, the pressure ranges set forth above have been taken on the basis of the use of a solvent system employing methyl ethyl ketone and a benzene-toluene admixture. Obviously, such pressure ranges would be different for other solvents or solvent systems or combinations.

Another obvious modification would be the deployment of additional heat exchange surfaces in lines 119 and 120. A further modification would be to circulate the solvent from line 119 to condenser 102 via line 130 to simplify the recovery of heat. Likewise, another modification would be to circulate the solvent condensed in heater 107 to heater 104 via line 131.

EXAMPLES OF THE INVENTION

The following examples are illustrative of the process of the present invention.

EXAMPLE I

Charge oil (105,269 kg/hr.) at a temperature of 100° C. is contacted with furfural (239,795 kg/hr.) at a temperature of 100° C. to form a raffinate product (67,037 kg/hr.) An extract-mix (264,297 kg/hr.) at a temperature of 55° C. is heated in heat exchanger 28 to a temperature of 170° C. and introduced into first flash column 30 operated at a pressure of 0.21 B.A.R. (G) of a solvent separation portion of a plant revamped in accordance with the present invention. The liquid bottoms from the first flash column 30 are heated to a temperature of about 190° C. and introduced with the second flash column 42, operated at a pressure of 1.03 B.A.R. (G). The liquid bottoms from the second flash column 42 is passed through the heater 50 and heated to a temperature of 232° C. prior to introduction into the third flash column 54, operated at a pressure of 2.07 B.A.R. (G). Substantially all of the furfural solvent is recovered with furfural losses amounting to less than about 0.03%. Daily savings in utilities compared with the plant in the original operational state amounted to 6.0 million kcal/hour.

EXAMPLE II

A wax filtrate including a solution of wax/oil and solvent is passed through three flash columns operated under the following conditions where the liquid effluent from the second flash column is heated in a heater prior to introduction into the third flash column.

| COLUMNS | PRESSURE (psig) | TEMPERATURE (°F.) |
|---|---|---|
| 105 | 2–15, preferably 4 | 200–250, preferably 220 |
| 108 | 30–60, preferably 51 | 300–350, preferably 320 |
| 112 | 70–1200, preferably 100 | 400–475, preferably 450 |

To each flash column, a liquid solvent stream is added to rectify solvent vapors. Utility savings amounted to about 35%.

While the invention has been described in connection with an exemplary embodiment thereof, it will be understood that many modifications will be apparent to those of ordinary skill in the art and that this application is intended to cover any adaptions or variations thereof. Therefore, it is manifestly intended that this invention be only limited by the claims and the equivalents thereof.

What is claimed is:

1. In a process for refining a petroleum hydrocarbon fraction selected from the group consisting of a vacuum gas oil, a deasphalted residual oil, and an asphalt-containing residual oil comprising undesirable components of cyclic, naphthenic, olefinic, aromatic, nitrogenous, and sulfurous compounds, or mixtures of any of such compounds wherein undesirable components are separated from said petroleum hydrocarbon fraction by a selective solvent selected from the group consisting of furfural, phenol, N-methyl pyrollidone, nitrobenezene and mixtures thereof and wherein said selective solvent is recovered by evaporation techniques from a solvent-enriched extract phase including said extracted undesirable components, an improved process for recovering said selective solvent from said solvent-enriched phase, which comprises:
  (a) heating said solvent-enriched phase and introducing the heated solvent-enriched phase into a first flash zone to effect flashing thereof to form a first vapor stream comprising solvent and a first bottom stream comprising substantially solvent and said undesirable components;
  (b) heating said first bottom stream and introducing the heated bottom stream into a second flash zone to effect flashing thereof to form a second vapor stream comprising solvent and a second bottom stream comprising substantially solvent and said undesirable components, said second flash zone being operated at above atmospheric pressure;
  (c) heating said second bottom stream;
  (d) introducing the heated second bottom stream into a third flash zone to effect flashing thereof to form a third vapor stream and a third bottom stream comprising said undesirable components, said first, second, and third flash zones being operated at incrementally increased ranges of temperatures and pressures whereby the vapor from any successive flash zone is used as a source of heat in the preceding flash zone to effect vaporization in said preceding flash zone; and
  (e) recovering said selective solvent from said vapor streams.

2. In a process for dewaxing a petroleum hydrocarbon fraction comprising, petroleum hydrocarbons, and dewaxed oil wherein said wax is extracted from the petroleum hydrocarbon fraction by a selective solvent selected from the group consisting of methyl ethyl ketone; mixtures of methyl ethyl ketone and benzene; mixtures of methyl ethyl ketone and toluene; mixtures of methyl ethyl ketone, benzene, and toluene; methyl isobutyl ketone; mixtures of methyl isobutyl ketone and benzene; mixtures of methyl isobutyl ketone and toluene; mixtures of methyl isobutyl ketone, benzene and toluene; dichloromethane; and methylene chloride and wherein said selective solvent is recovered by evaporative techniques from a solvent-enriched extract phase including said dewaxed oil, an improved process for recovering said solvent from said the solvent-enriched phase, which comprises:
  (a) heating said solvent-enriched phase and introducing the heated solvent-enriched phase into a first flash zone to effect flashing thereof to form a first vapor stream comprising solvent and a first bottom stream comprising substantially solvent and said dewaxed oil;
  (b) heating said first bottom stream and introducing the heated bottom stream into a second flash zone to effect flashing thereof to form a second vapor stream comprising solvent and a second bottom stream comprising substantially solvent and said dewaxed oil, said second flash zone being operated at above atmospheric pressure;
  (c) heating said second bottom stream;
  (d) introducing the heated second bottom stream into a third flash zone to effect flashing thereof to form a third vapor stream and a third bottom stream comprising said wax, said first, second, and third flash zones being operated at incrementally increased ranges of temperatures and pressures whereby the vapor from any successive flash zone is used as a source of heat in the preceding flash zone to effect vaporization in said preceding flash zone; and
  (e) recovering said selective solvent from said vapor streams.

3. In a process for deasphalting a petroleum hydrocarbon fraction comprising asphalt wherein deasphalted oil is extracted from the petroleum hydrocarbon fraction by a selective solvent selected from the group consisting of at least one $C_3$–$C_5$ alkane and mixtures of at least one $C_3$–$C_5$ alkane with ethane, propylene, or butylene and wherein said solvent is recovered by evaporative techniques from a solvent-enriched extract phase including said extracted deasphalted oil, an improved process for recovering said solvent from said solvent-enriched phase, which comprises:
  (a) heating said solvent-enriched phase and introducing the heated solvent-enriched phase into a first flash zone to effect flashing thereof to form a first vapor stream comprising solvent and a first bottom stream comprising substantially solvent and said deasphalted oil;
  (b) heating said first bottom stream and introducing the heated bottom stream into a second flash zone to effect flashing thereof to form a second vapor stream comprising solvent and a second bottom stream comprising substantially solvent and said asphalt, said second flash zone being operated at above atmospheric pressure;
  (c) heating said second bottom stream;
  (d) introducing the heated second bottom strem into a third flash zone to effect flashing thereof to form a third vapor stream and a third bottom stream comprising said deasphalted oil, said first, second, and third flash zones being operated at incrementally increased ranges of temperatures and pressures whereby the vapor from any successive flash zone is used as a source of heat in the preceding flash zone to effect vaporization in said preceding flash zone; and
  (e) recovering said selective solvent from said vapor streams.

4. The process as defined in claim 1 wherein the heating of said second bottom stream is effected by a fired heater.

5. The process as defined in claim 2 wherein the heating of said second bottom stream is effected by a fired heater.

6. The process as defined in claim 3 wherein the heating of said second bottom stream is effected by a fired heater.

7. The process as defined in claim 4 wherein said solvent is furfural.

8. The process as defined in claim 5 wherein said solvent is a solvent selected from the group consisting of methyl ethyl ketone and methyl isobutyl ketone.

9. The process as defined in claim 1 further comprising at least one additional flash zone.

10. The process as defined in claim 2 further comprising at least one additional flash zone.

11. The process as defined in claim 3, further comprising at least one additional flash zone.

12. The process as defined in any one of claims 1 to 3 wherein liquid solvent is introduced into the upper portion of each of said flash zones.

13. The process as defined in any one of claims 1 to 3 wherein the second and third vapor streams are condensed and introduced into a column in contact with said first vapor stream and wherein a vapor stream is withdrawn therefrom and passed in indirect heat transfer relationship to a water stream to reproduce steam.

* * * * *